US010523775B2

(12) United States Patent
Shetty et al.

(10) Patent No.: US 10,523,775 B2
(45) **Date of Patent: *Dec. 31, 2019**

(54) FLOW EXTENSION CONTROLLER

(71) Applicant: SAP SE, Walldorf (DE)

(72) Inventors: Jagdeep Shetty, Palo Alto, CA (US); John Lark, Palo Alto, CA (US); Kshitij Dayal, Los Altos, CA (US); Pankaj Khandelwal, Palo Alto, CA (US); Jennifer Chen, Los Gatos, CA (US); Dinesh Shahane, Cupertino, CA (US)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/028,327

(22) Filed: Jul. 5, 2018

(65) Prior Publication Data

US 2018/0316774 A1 Nov. 1, 2018

Related U.S. Application Data

(63) Continuation of application No. 15/068,346, filed on Mar. 11, 2016, now Pat. No. 10,044,636.

(51) Int. Cl.
*H04L 29/08* (2006.01)
*H04L 12/24* (2006.01)
*H04L 12/927* (2013.01)

(52) U.S. Cl.
CPC ........ *H04L 67/2823* (2013.01); *H04L 41/509* (2013.01); *H04L 41/5054* (2013.01); *H04L 47/803* (2013.01); *H04L 67/10* (2013.01); *H04L 67/2814* (2013.01)

(58) Field of Classification Search
None
See application file for complete search history.

(56) References Cited

U.S. PATENT DOCUMENTS

| | | | |
|---|---|---|---|
| 2008/0127183 | A1 | 5/2008 | Emerson |
| 2011/0093567 | A1 | 4/2011 | Jeon |
| 2011/0125894 | A1 | 5/2011 | Anderson |
| 2011/0209064 | A1 | 8/2011 | Jorgensen |

(Continued)

*Primary Examiner* — Phirin Sam
*Assistant Examiner* — Tarell A Hampton
(74) *Attorney, Agent, or Firm* — Mintz Levin Cohn Ferris Glovsky and Popeo, P.C.

(57) ABSTRACT

Methods and apparatus, including computer program products, are provided for flow control. In one aspect, there is provided a method, wherein the method may include monitoring, by an external flow controller, a workflow at a first cloud application to determine whether at least one condition is satisfied to extend the workflow to a second cloud application external to the first cloud application; diverting, by the external flow controller, when the at least one condition is satisfied; handling, by the external flow controller, a request to divert the workflow to the second cloud application by at least formatting the request in accordance with configuration information at the external flow controller; sending, by the external flow controller, the workflow to the second cloud application; receiving, by the external flow controller, a result to incorporate into the workflow at the first cloud application; and/or proceeding with the workflow at the first cloud application.

18 Claims, 4 Drawing Sheets

400

(56) References Cited

U.S. PATENT DOCUMENTS

| | | | | |
|---|---|---|---|---|
| 2011/0302312 | A1 | 12/2011 | McCrory | |
| 2012/0096521 | A1 * | 4/2012 | Peddada | G06F 21/629 726/4 |
| 2012/0331118 | A1 | 12/2012 | Stein | |
| 2013/0311420 | A1 | 11/2013 | Tehranchi | |
| 2014/0207918 | A1 * | 7/2014 | Kowalski | H04L 41/0803 709/220 |
| 2014/0253957 | A1 | 9/2014 | Tye | |
| 2014/0280484 | A1 | 9/2014 | Klemenz | |
| 2015/0032817 | A1 | 1/2015 | Garg | |
| 2015/0033365 | A1 | 1/2015 | Mellor | |
| 2015/0347542 | A1 | 12/2015 | Sullivan | |
| 2016/0191623 | A1 | 6/2016 | Vasudevan | |
| 2017/0139997 | A1 * | 5/2017 | Arasan | G06F 21/6218 |
| 2017/0171158 | A1 | 6/2017 | Hoy | |

* cited by examiner

```
<!-- version, for maintaining multiple versions of the extension -->
<FlowExtension id="" version="" >   202

    <!-- Multiple Stages to be allowed for the same extension to be called from -->
    <Stage name="PRE_PROPAGATION" />   204
    <!-- Conditions based on which this flow extension be called, besides subscription -->
    <Conditions>   206
    </Conditions>

    <!-- The definition of the request created between AN and Service Provider -->
    <Outbound>
        <!-- Source document for the request -->
        <Source />   210

        <!-- Template for the request object -->
        <Template/>   212

        <!-- Request handler class for handling the source document and do the translation if required -->
        <Handler/>   214

        <!-- The details of the end point where request has to be pushed. Host, port, cert etc -->
        <!-- Push/ -->   216

        <!-- The details to pull out the request docuemnt from AN, like a directAction, queuename, port, certs, API details etc -->
        <!-- Pull can be achieved using the API once it is available -->
        <Pull/>
    </Outbound>   218
                                                                   208
    <Inbound>
        <!-- Template for the response object -->
        <Template/>   222

        <!-- Inbound handler for the response, can be used for the translation -->
        <Handler/>   224
                                                                   220

        <Post API />
    </Inbound>
                  226
</FlowExtension>
```

FIG. 2

FLOW EXTENSION CONTROLLER

This Application is a Continuation of application Ser. No. 15/068,346 filed on Mar. 11, 2016, entitled "FLOW EXTENSION CONTROLLER." The entire contents of the application is incorporated herein by reference in its entirety.

FIELD

The present disclosure generally relates to data processing and, in particular, controlling access to a workflow.

BACKGROUND

A server-based application, such as cloud-based application, may enable one or more user equipment to interact with the application. For example, the user equipment, such as a computer, a tablet, a smart phone, or other processor-based device, may present a user interface, such as a page, through which the user interface or page can interact with the cloud-based application. These actions performed at the user interface are provided to the cloud based application, which may then trigger another action such as a response. In this way, the cloud application may execute, and/or control execution of, a workflow via the interaction at the user interface(s).

SUMMARY

Methods and apparatus, including computer program products, are provided for flow control.

In one aspect, there is provided a method, wherein the method may include monitoring, by an external flow controller, a workflow at a first cloud application to determine whether at least one condition is satisfied to extend the workflow to a second cloud application external to the first cloud application; diverting, by the external flow controller, when the at least one condition is satisfied; handling, by the external flow controller, a request to divert the workflow to the second cloud application by at least formatting the request in accordance with configuration information at the external flow controller; sending, by the external flow controller, the workflow to the second cloud application; receiving, by the external flow controller, a result to incorporate into the workflow at the first cloud application; and/or proceeding with the workflow at the first cloud application.

In some implementations, the above-noted aspects may further include additional features described herein including one or more of the following. The configuration information may include an identifier to uniquely identify the workflow. The configuration information may include a location indicative of where in the workflow the extension controller is allowed to extend the workflow to the second cloud application. The configuration information may include the at least one condition defining when the workflow is allowed to be extended to the second cloud application. The at least one condition may include a timer defining a time after which the extension controller can proceed with the workflow when the second application has not provided the result. The configuration information may include an outbound template defining a source document at the first cloud application. The outbound template may define the formatting and at least one element in the source document that is allowed to be provided to the second cloud application. The outbound template may define a location of the second cloud application. The configuration information may include an inbound template defining a format for the result being returned by the second cloud application to the first cloud application. The configuration information may include information defining at least one module in the first cloud application that should be executed after the second cloud application returns the result.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

In the drawings,

FIG. 2 depicts an example of configuration information which may be used by an external flow controller to control a workflow, in accordance with some example embodiments;

Figure 1:
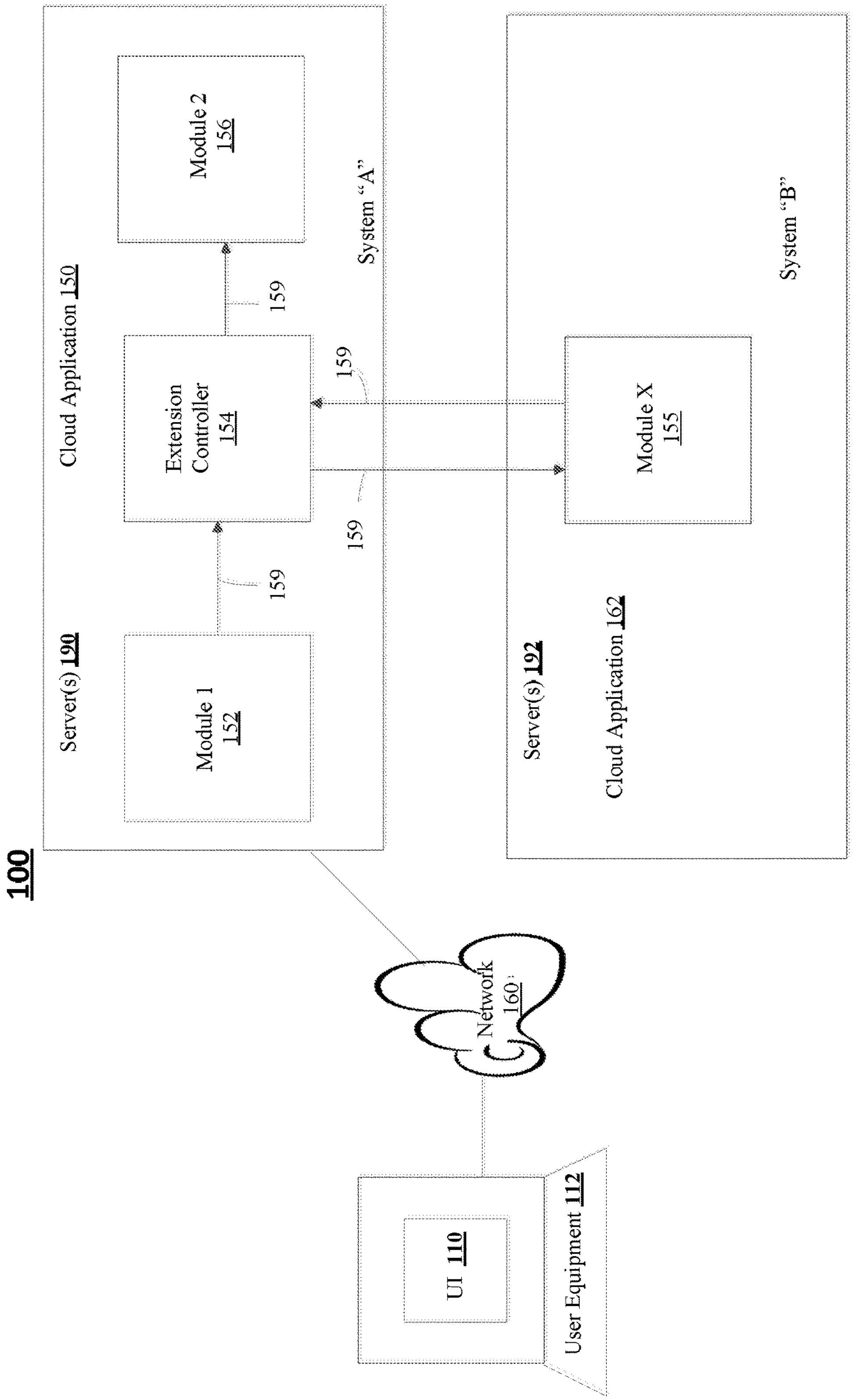
FIG. 1 depicts an example of a system for flow control, in accordance with some example embodiments.

Like labels are used to refer to same or similar items in the drawings.

DETAILED DESCRIPTION

As noted above, cloud applications are becoming increasingly popular for a variety of reasons. However, a cloud application is generally provided by, or under the control of, a single entity or system. For example, a cloud application may be provided by a developer, service provider, or system to process a workflow such as the functions required to complete a purchase order, submit a purchase order for approval, track the purchased item, and pay a vendor associated with the purchased item. In this example workflow, a single cloud application handles or controls the workflow.

In some example embodiments, there is provided a workflow extension controller (also referred to herein as an extension controller) that enables a workflow in a given process to be extended to another cloud application under the control of, for example, a third party, such as another developer, another service provider, and/or another system.

FIG. 1 depicts an example of a system 100 for flow extension control, in accordance with some example embodiments.

The system 100 may include a user equipment 112, such as a tablet, a computer, a smartphone, and/or any other device including at least one processor and at least one memory including program code. The user equipment 112 may include a user interface (UI) 110, such as a browser, a client application, and/or the like, configured to interact with at least one cloud application 150 via network 160 (for example, a wired network, a wireless network, a cellular network, the Intranet, and/or any other network or link). The user interface 110 may be downloaded from server 190 (and/or another server) via network 160 (and/or a wireless channel).

In the example of FIG. 1, the cloud application 150 may be hosted at one or more servers 190. The server 190 may comprise at least one processor and at least one memory including program code configured to provide the functions described herein with respect to server 190 including cloud application 150, extension controller 154, modules 152 and 156, and/or the like.

In some example embodiments, the cloud application 150 may be associated with one or more workflow modules 152 and 156 and an extension controller 154, in accordance with some example embodiments. For example, module 1 152 may relate to a first step of a workflow such as authorizing payment of a purchase order and module 2 156 may relate to a subsequent step of actually sending payment to a vendor associated with the purchase order. However, there may be a need for an intermediary step to check in certain jurisdictions for certain tax credit associated with certain types of purchases. This intermediary step may be performed by another cloud application 162. This other cloud application 162 may be external to server 190 at another server 192 and/or may be under the control of another entity, another service provider, and/or another system, such as another software as a service (SaaS) provider at system B.

In some example embodiments, the extension controller 154 is provided as part of the workflow 159. The extension controller 154 may provide an application program interface (API), logic, and/or configuration information to control whether a workflow 159 should proceed directly from module 1 152 to module 2 156 or be diverted to module X 155 at cloud application 162 and server 192. Referring to the previous example regarding tax credits, the extension controller 154 may include logic specifying under what conditions the workflow should proceed directly from module 1 152 to module 2 156 or be diverted to module X 155 at cloud application 162. Moreover, the extension controller 154 may define what types of data are allowed to be provided to module X 155. Alternatively or additionally, the extension controller 154 may define the format of the data to be returned from module X 155. Alternatively or additionally, the extension controller 154 may define what module, such as module 2 156, should be executed next in the workflow 159 when module X 155 completes its portion of workflow processing.

Although FIG. 1 depicts a simplified workflow, the workflow may include additional modules and/or extension controllers as well. Moreover, although the workflow 159 is depicted as a simplified serial workflow, the workflow may include other flow formats including for example parallel flows after module X 155, a halt (or stop) after module X 155, timeouts after module X 155, and the like. Furthermore, although some of the examples described herein refer to a workflow associated with a purchase order, this is merely an illustrative example as other types of workflows may be handled as well.

In some example embodiments, the extension controller 152 may include an application program interface through which a third party application, such as cloud application 162 including module X 155 may intercept a workflow. The extension controller 154 may define when or in what stage of a workflow the extension controller 154 is allowed to intercept the workflow 159 and divert it to a third party application such as cloud application 162 including module X 155 (which is external to the cloud application 150 and/or system A). For example, the extension controller 152 may define a condition providing a location in the workflow 159, and this location may indicate that the extension controller 152 can intercept the workflow 159 after module 152 and before module 156.

In some example embodiments, the extension controller 152 may also include logic defining at least one condition under which the extension controller 154 is allowed to intercept workflow 159. Referring again to the tax credit example, the extension controller 154 may include logic defining a condition comprising if a purchase is for solar panels in the US (for example, purchase item="solar panels"), then the workflow 159 after module 152 should be diverted to module X 155, where processing can determine whether a tax credit can be realized for the purchase order.

In some example embodiments, the extension controller 152 may also include configuration information defining what information and/or in what format the information can be provided to module X 155 at server 192. Referring again to the tax credit example, the extension controller 154 may include configuration information such as an outbound template defining what data elements extension controller 154 is allowed to provide to module X 155 for tax credit processing. In this example, the configuration information may define in a given purchase order document the identity of the data elements corresponding to the item being purchased, the dollar amount for the item, where the purchased item is to be delivered, and/or other information to allow the module X 155 to determine whether a tax credit can be realized. The configuration information may also specify the format of the data being provided to module X (for example, currency, date formats, and/or the like).

In some example embodiments, the extension controller 152 may also include configuration information defining what information and/or in what format the information can be returned from module X 155 to cloud application 150. Referring again to the tax credit example, the extension controller 154 may include configuration information such as an inbound template defining what module X 155 is allowed to return to extension controller 154. To illustrate further, the inbound template may indicate module X 155 is only allowed to return to extension controller 154 a dollar amount indicative of the tax credit, for example.

In some example embodiments, the extension controller 152 may also include workflow continuation information. For example, extension controller's 152 configuration information may indicate what module(s) should be executed next, such as module 2 156. The extension controller 152 may also include conditions under which the result returned should halt a workflow 159, trigger another module 2 156, trigger a plurality of modules (in serial or in parallel).

In some example embodiments, the extension controller 152 may also include temporal conditions indicating how long the cloud application 150 including extension controller 154 should wait for a result from an external module, such as module X 155. For example, if module X does not respond within a result in a predefined time, extension controller 154 may proceed to module 156.

FIG. 2 depicts an example implementation of the configuration information that may be included in an extension controller, such as extension controller 154.

The extension controller's configuration information may include an identifier 202. The identifier 202 may allow the cloud application 150 to uniquely identify a given flow controller (which may be mapped to a specific external module and/or cloud application) and its configuration information. The identity may also be used to determine a current version of the configuration information. Cloud application 150 may have a plurality of extension controllers that subscribe to and thus monitor the workflow, and each extension control may be monitoring the workflow for a corresponding external module or cloud application. The identifier 202 may allow the cloud application 150 to identify a given extension controller.

The configuration information may include an indication of workflow location 204, such as where in a workflow an extension controller can be placed. In the example of FIG. 2A, the stage name 204 defines a location in a workflow at which the extension controller 154 can be located.

The configuration information may specify at least one condition 206. The condition 206 may specify the condition under which the extension controller 154 can call module X 155. For example, the condition 206 may include logic defining a state of data, such as if a workflow includes a purchase order and module 1 152 has been executed, then allow the extension controller 154 to call module X 155. The conditions may also be temporal, such as defining a time period under which extension controller 154 can invoke module X 155.

The configuration information may specify the format 208 of the outbound data being sent by extension controller 154 to module X 155. In the example of FIG. 2, the condition 208 includes an identity of a source document 210 being handled by the workflow 159 (for example, an identifier of a purchase order document). The configuration information may identify an outbound template 212 defining which data elements from the source document can be provided to module X 155. For example, the outbound template 212 may define which specific data elements (such as the identity of the item being purchased, the dollar amount of the item, and where the purchased item is to be delivered) in the source document identity 210 can be provided to module X 155 to enable the tax credit processing. The following provides another example of an outbound template 212:

```
<Template>
    <DataRequest extension="$extension" eventId="$event">
        <Source> $src </Source>
        <Reference> </Reference>
    </DataRequest>
</Template>
```

In this example, the outbound template defines an outbound request to module X 155 which is processing for example an invoice document. The outbound template includes an identifier for this flow extension 159. The "$event" field refers to a unique notification identifier sent to a service provider, such as cloud application 162 including module X 155. The response from the module X 155 may include the "$event" to enable mapping a subsequent result or response from module X to the initial outbound request. The outbound template also includes the identity of the source document ($src"), such as the invoice which is the subject of the flow extension 159.

The extension controller's configuration information may specify a request handler 214. The request handler identifies a certain handler at the cloud application 150 including extension controller 154 handling the outbound request to module X 155 and a corresponding inbound response from module X 155.

The extension controller's configuration information may specify the location 216 (labeled push) of module X 155 and the location 218 (labeled pull) of an API where the extension controller can be accessed. In the example of FIG. 2, the location may comprise an identification of a host, a port, any certificates required for access, and/or the like.

The extension controller's configuration information may also specify the inbound template 220 for responsive data from module X 155. The inbound template 220 may specify the format 222 of the inbound data being sent by module X 155 to extension controller 154. The inbound template 220 may also specify a certain handler 224 at the cloud application 150 including the extension controller 154 handling the inbound response from module X 155. The inbound template 220 may also specify an API or push 226. The inbound template provides the capability for service provider to post updates with customized formatted content. The inbound template defines the content posted via a post API for example. For the example provided, the Service Provider will post with content as follows:

```
<DataResponse extension="invoice_flow_extension" eventId=
"00000214431241 ">
<Comment> This invoice has been approved </comment>
<AttachmentID>InvoiceApprovalMar072016</AttachmentID>
</DataResponse>
```

Figure 3:
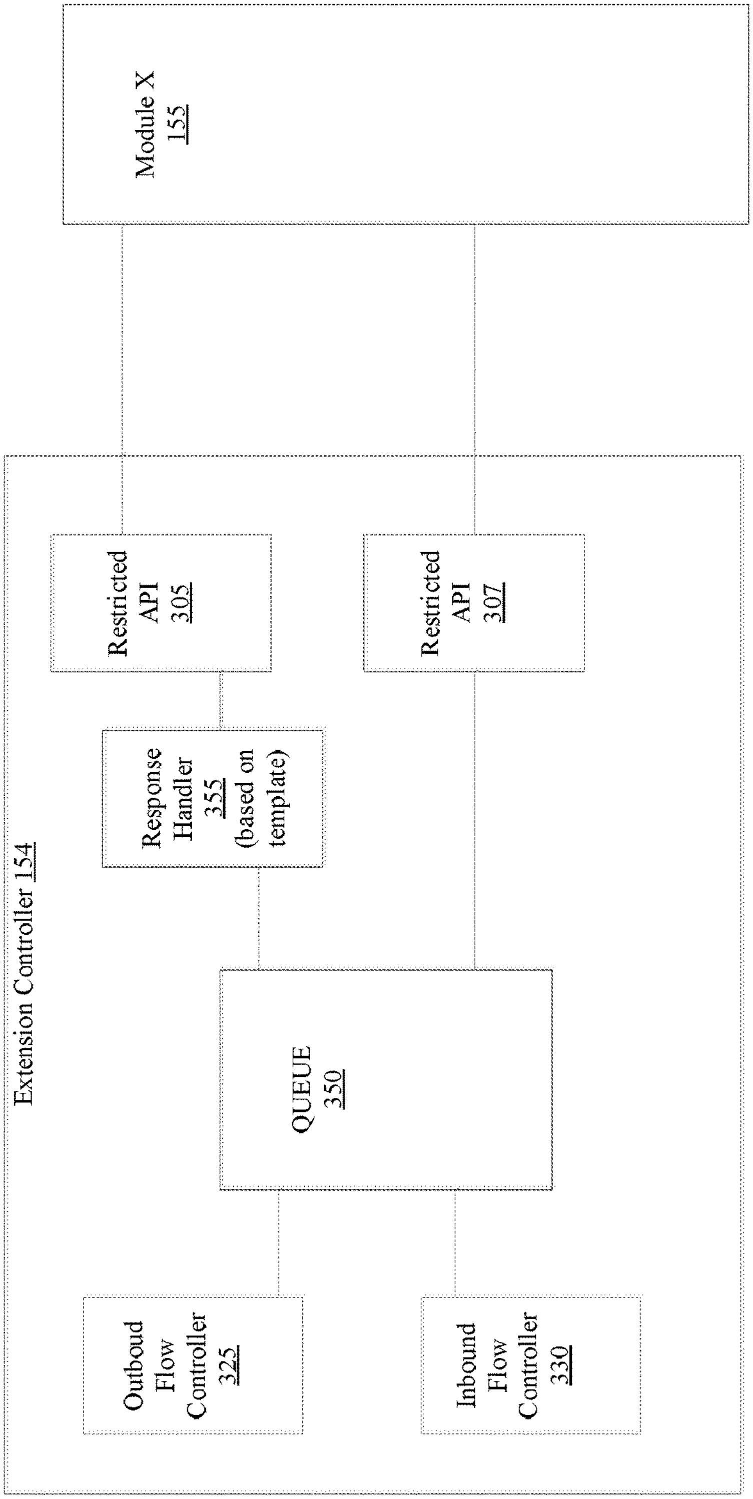
FIG. 3 depicts an example of an external flow controller, in accordance with some example embodiments.

FIG. 3 depicts an example of an implementation of the extension controller 154, in accordance with some example embodiments.

The extension controller 154 may include an outbound flow controller 325 for handling outbound requests to module X 155. For example, extension controller 154 may monitor a workflow to determine whether the extension controller 154 is allowed to call, as noted above, module X 155 to an external module such as module X 155. When allowed, the outbound flow controller 325 may handle the call and queue the call for processing in queue 350. The response handler may then format the request to module X 155 in an outbound template format as described above, and then send the request via API 305 to module X 155. Once sent, the response handler may mark the event mapped to the workflow request as being sent.

In response, module X 155 may return a result to extension controller 154 via API 307. The result may be placed in queue 305 and formatted at inbound flow controller 330 in accordance with an inbound template as described above. Once received, the controller 330 may mark the event response mapped to the event at queue 350 as being received. A scheduler thread may be executed to track events in the queue, which is past the expiry time and would mark them as failed with "no-response" and workflow can continue.

In some example embodiments, after each stage in the workflow such as after each module, the cloud application 150 may check if the current workflow (or the designated document owner(s) of that workflow) has any service subscriptions to an extension controller (or the corresponding external workflow module and/or cloud application). If so, then the workflow including the document may evaluated for extension processing at 400 to determine whether it meets the conditions at a given extension controller for calling an external module or cloud application. In some example embodiments, a given extension controller 154 may be mapped to a single, external cloud application or module such as module 155, although a given extension controller 154 may be mapped to a plurality of external modules or cloud applications.

In some example embodiments, the API 305 and/or 307 may be restricted with respect to access by requiring a certificate (or a shared secret such as a shared secret key) in order to be able to access API 305 and/or 307.

Figure 4:
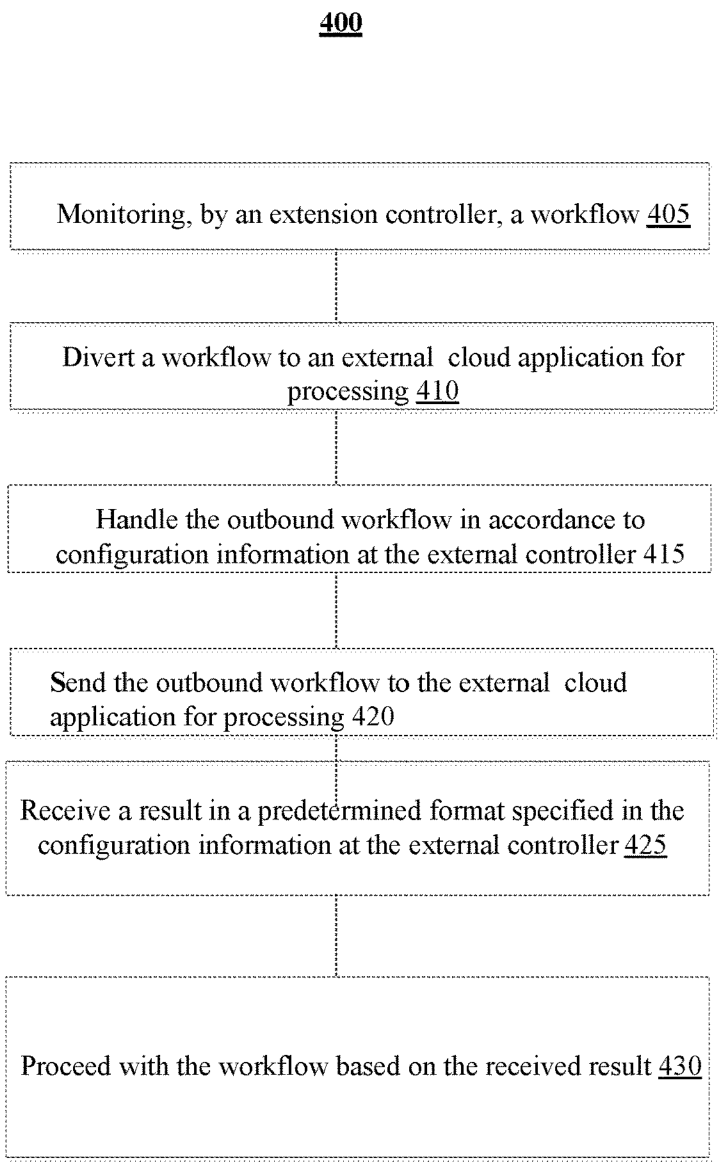
FIG. 4 depicts an example of a process for external flow control, in accordance with some example embodiments.

FIG. 4 depicts an example of a process 400 for controlling workflow extensions, in accordance with some example embodiments.

At 405, the extension controller 405 may monitor a workflow. For example, extension controller 154 may monitor a workflow at server 190 and/or cloud application 150. If the workflow triggers any conditions as noted above, the extension controller 405 may trigger creation of an event, which may be recorded in queue 350 for processing.

At 410, the extension controller 154 may divert a workflow to an external cloud application for processing. For example, extension controller 154 including outbound flow controller 325 may divert a workflow 159 by at least filtering one or more data elements defined in the configuration information for the extension controller 154. The filtering may yield certain data elements of a workflow document, and these data elements are the elements that the external module 155 is allowed to receive.

At 415, the extension controller 154 may handle the outbound workflow in accordance with configuration information at the external controller 154. For example, extension controller 154 including response handler 305 may format the data sent to the external module 155, and this formatting may be defined in an outbound flow template as noted above.

At 420, the extension controller 154 may send the outbound workflow to the external cloud application including external module 155 for processing. For example, extension controller 154 including response handler 305 may send the formatted data elements via restricted API 305 to the external module 305. The message may indicate an event identifier at the queue 350, so when a response is returned it can be matched to the outgoing request.

At 425, the extension controller 154 may receive a result in a predetermined format specified in the configuration information at the external controller. For example, extension controller 154 may receive via API 307 a result from the external module such as external module 155. The response may be formatted by external module 155 and/or the response may be formatted by the inbound flow controller 330 in accordance with an inbound filter. The inbound flow controller 330 may identify the outgoing event in queue 350 and mark or otherwise flag that a response has been received at queue 350.

At 430, the extension controller 154 may proceed with the workflow based on the received result. For example, extension controller 154 may trigger execution of another module such as module 2 156. The next module(s) to be executed may be defined in the extension controller's configuration information as noted above.

Without in any way limiting the scope, interpretation, or application of the claims appearing herein, a technical effect of one or more of the example embodiments disclosed herein may include deterministic control of cloud based applications and workflows. Moreover, without in any way limiting the scope, interpretation, or application of the claims appearing herein, a technical effect of one or more of the example embodiments disclosed herein may include centralized control of cloud based applications and workflows.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein does not require the particular order shown, or sequential order, to achieve desirable results. Other embodiments may be within the scope of the following claims.

What is claimed:

1. A method comprising:

monitoring, by a controller, a workflow at a first cloud application;

determining, by the controller, whether at least one condition is satisfied to extend the workflow to a second cloud application external to the first cloud application; and extending, by the controller when the at least one condition is satisfied, the workflow to the second cloud application by at least:

formatting, by the controller, a request to divert the workflow in accordance with configuration information at the controller;

sending, by the controller, the request to the second cloud application;

receiving, by the controller and in response to the request, a result from the second cloud application; and proceeding, at the first cloud application, with the workflow including the received result from the second cloud application, wherein the configuration information includes information defining at least one module in the first cloud application to be executed after the second cloud application returns the result.

2. The method of claim 1, wherein the configuration information includes an identifier to uniquely identify the workflow.

3. The method of claim 1, wherein the configuration information includes a location indicative of where in the workflow the controller is allowed to extend the workflow to the second cloud application.

4. The method of claim 1, wherein the configuration information includes the at least one condition defining when the workflow is allowed to be extended to the second cloud application.

5. The method of claim 4, wherein the at least one condition includes a timer defining a time after which the first cloud application can proceed with the workflow when the second cloud application has not provided the result.

6. The method of claim 1, wherein the configuration information includes an outbound template defining a source document at the first cloud application.

7. The method of claim 6, wherein the outbound template further defines the formatting and at least one element in the source document that is allowed to be provided to the second cloud application.

8. The method of claim 7, wherein the outbound template further defines a location of the second cloud application.

9. The method of claim 1, wherein the configuration information includes an inbound template defining a format for the result being returned by the second cloud application to the first cloud application.

10. A system comprising:

at least one processor; and at least one memory including program code which when executed causes operations comprising:

monitoring, by a controller, a workflow at a first cloud application;

determining, by the controller, whether at least one condition is satisfied to extend the workflow to a second cloud application external to the first cloud application; and extending, by the controller when the at least one condition is satisfied, the workflow to the second cloud application by at least:

formatting, by the controller, a request to divert the workflow in accordance with configuration information at the controller;

sending, by the controller, the request to the second cloud application;

receiving, by the controller and in response to the request, a result from the second cloud application; and proceeding, at the first cloud application, with the workflow including the received result from the second cloud application, wherein the configuration information includes information defining at least one module in the first cloud application to be executed after the second cloud application returns the result.

11. The system of claim 10, wherein the configuration information includes an identifier to uniquely identify the workflow.

12. The system of claim 10, wherein the configuration information includes a location indicative of where in the workflow the controller is allowed to extend the workflow to the second cloud application.

13. The system of claim 10, wherein the configuration information includes the at least one condition defining when the workflow is allowed to be extended to the second cloud application.

14. The system of claim 13, wherein the at least one condition includes a timer defining a time after which the first cloud application can proceed with the workflow when the second cloud application has not provided the result.

15. The system of claim 10, wherein the configuration information includes an outbound template defining a source document at the first cloud application.

16. The system of claim 15, wherein the outbound template further defines the formatting and at least one element in the source document that is allowed to be provided to the second cloud application.

17. A non-transitory computer-readable storage medium including program code which when executed by at least one processor causes operations comprising:

monitoring, by a controller, a workflow at a first cloud application;

determining, by the controller, whether at least one condition is satisfied to extend the workflow to a second cloud application external to the first cloud application; and extending, by the controller when the at least one condition is satisfied, the workflow to the second cloud application by at least:

formatting, by the controller, a request to divert the workflow in accordance with configuration information at the controller;

sending, by the controller, the request to the second cloud application;

receiving, by the controller and in response to the request, a result from the second cloud application; and proceeding, at the first cloud application, with the workflow including the received result from the second cloud application, wherein the configuration information includes information defining at least one module in the first cloud application to be executed after the second cloud application returns the result.

18. The non-transitory computer-readable storage medium of claim 17 wherein the at least one condition includes a timer defining a time after which the first cloud application can proceed with the workflow when the second cloud application has not provided the result.

* * * * *